Sept. 16, 1924.  
C. S. SOMERVELL  
1,508,623  
IMPACT OR PERCUSSIVE TOOL OF THE EXPLOSION MOTOR TYPE  
Filed May 31, 1922 6 Sheets-Sheet 1

INVENTOR  
C. S. SOMERVELL  
BY Murray C. Bayer  
ATTORNEY

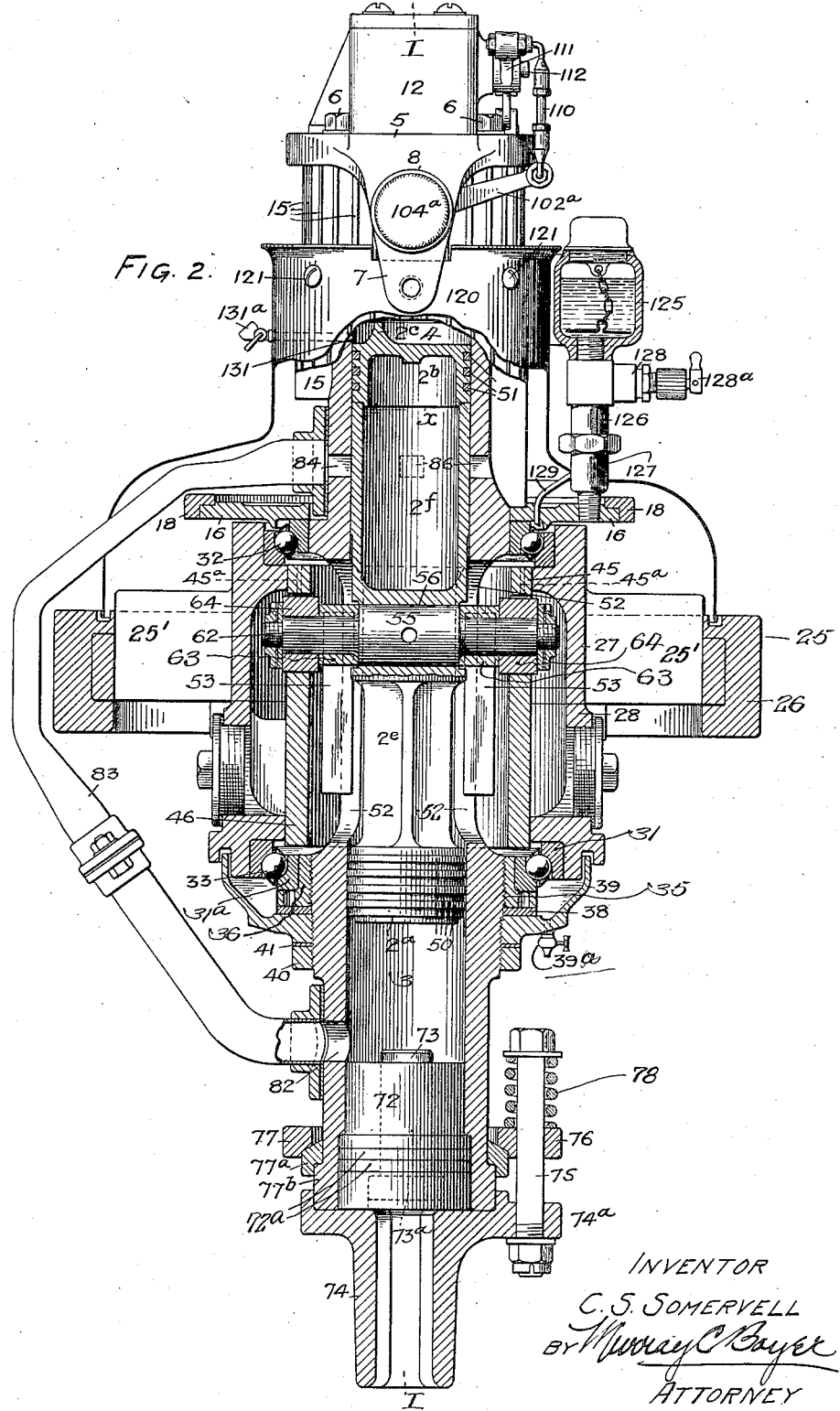

Sept. 16, 1924.  
C. S. SOMERVELL  
IMPACT OR PERCUSSIVE TOOL OF THE EXPLOSION MOTOR TYPE  
Filed May 31, 1922  6 Sheets-Sheet 3
1,508,623
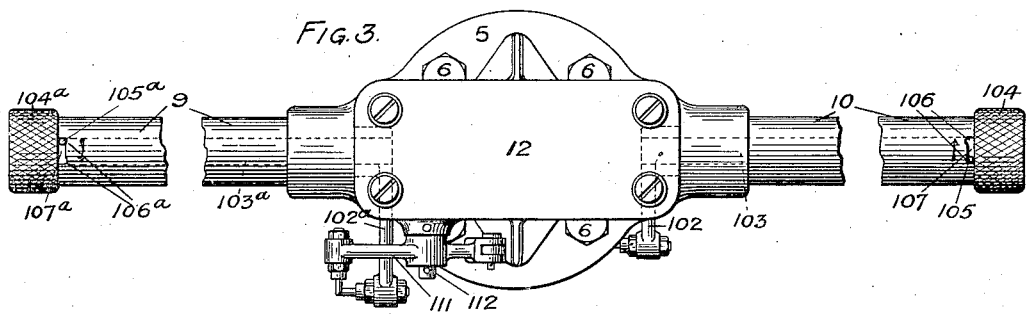
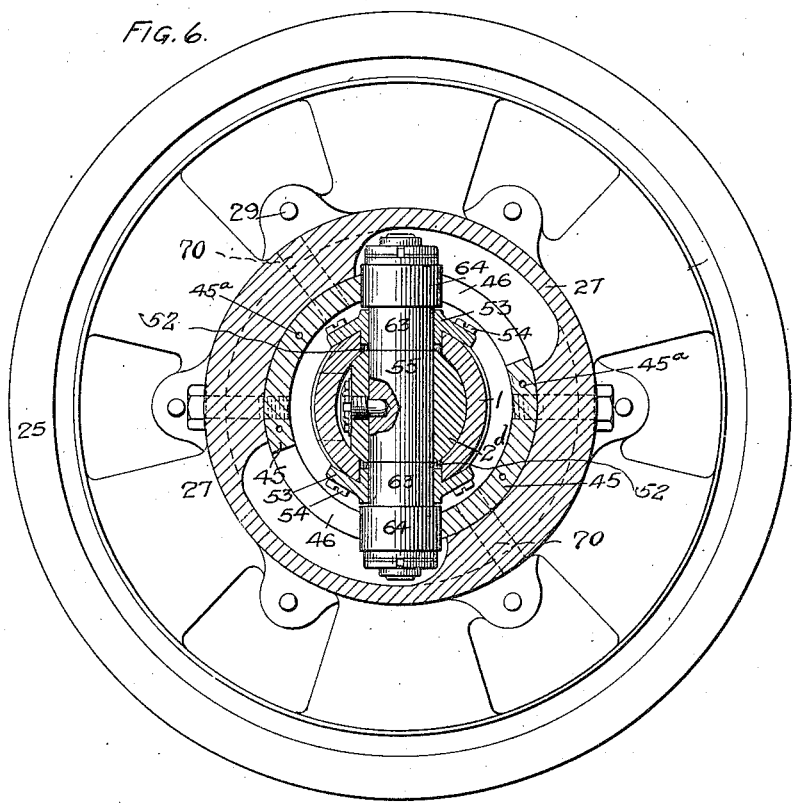
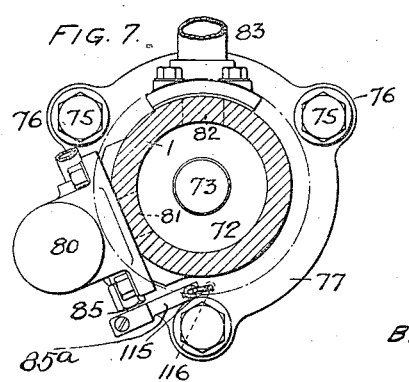
INVENTOR  
C. S. SOMERVELL  
BY Murray C. Boyer  
ATTORNEY.

Sept. 16, 1924.  1,508,623
C. S. SOMERVELL
IMPACT OR PERCUSSIVE TOOL OF THE EXPLOSION MOTOR TYPE
Filed May 31, 1922    6 Sheets-Sheet 4

INVENTOR
C. S. SOMERVELL.
BY Murray C Bayer
ATTORNEY.

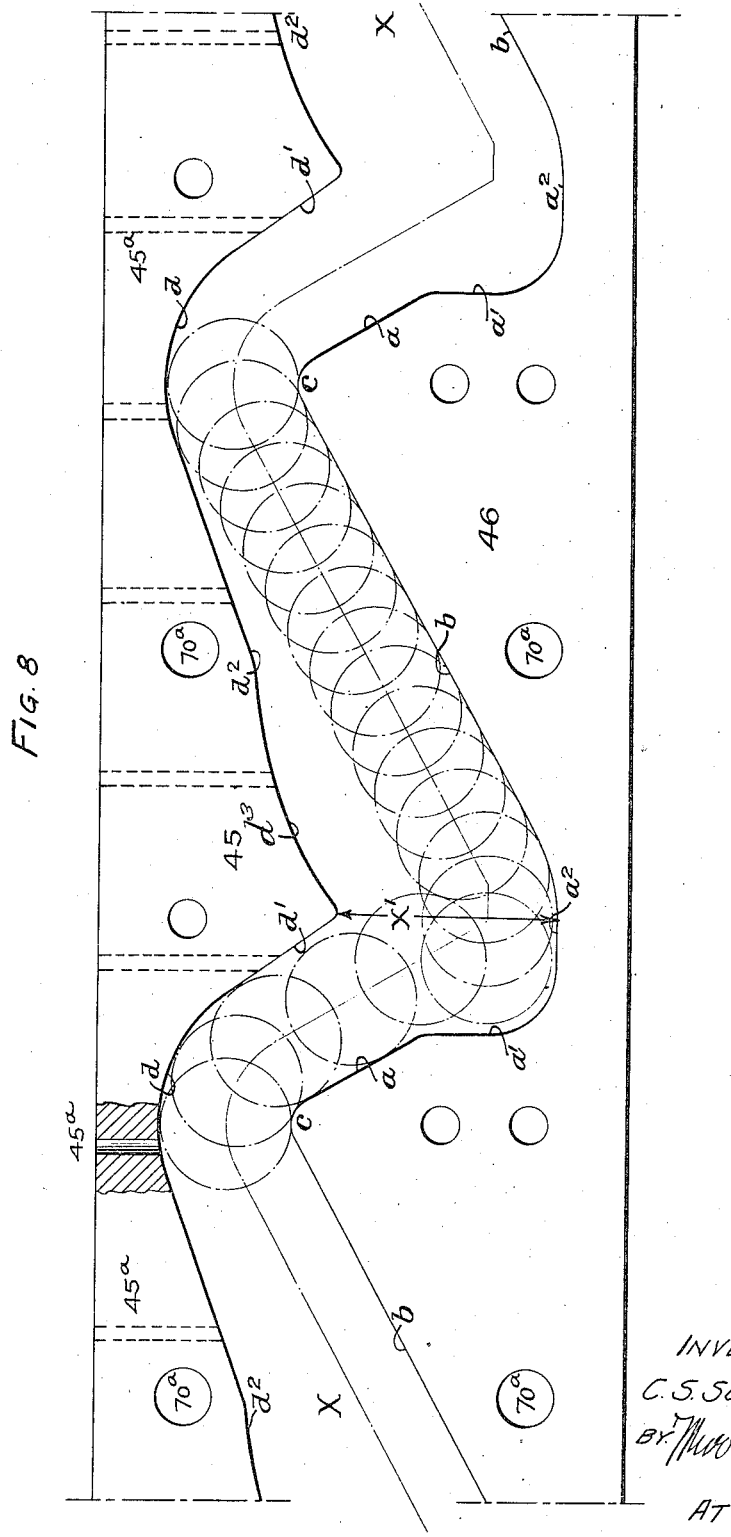

Sept. 16, 1924. 1,508,623
C. S. SOMERVELL
IMPACT OR PERCUSSIVE TOOL OF THE EXPLOSION MOTOR TYPE
Filed May 31, 1922 6 Sheets-Sheet 6

INVENTOR
C. S. SOMERVELL.
BY Murray C Boyer
ATTORNEY

Patented Sept. 16, 1924.

1,508,623

UNITED STATES PATENT OFFICE.

CHARLES S. SOMERVELL, OF RIVERTON, NEW JERSEY.

IMPACT OR PERCUSSIVE TOOL OF THE EXPLOSION-MOTOR TYPE.

Application filed May 31, 1922. Serial No. 564,825.

*To all whom it may concern:*

Be it known that I, CHARLES STUART SOMERVELL, a citizen of the United States, and a resident of Riverton, Burlington County, New Jersey, have invented certain new and useful Improvements in Impact or Percussive Tools of the Explosion-Motor Type, of which the following is a specification.

My invention relates to that type of drill or hammer in which a piston-hammer is arranged to reciprocate within a cylinder and to forcibly engage a drill-bit, chisel, riveting die or other similar type of implement at the end of its power stroke or impulse; the movement of such piston on its power stroke being effected by force developed from the explosion of a gaseous mixture.

The structure forming the subject of my invention, includes a cylinder and an impact piston reciprocated within said cylinder on the principle of a single-acting combustion engine of the two-cycle type in so far as the initial compression of a gaseous fuel, the transfer of the explosive mixture to the combustion end of the cylinder, the final compression and explosion of the mixture, and the expulsion of the spent gases of combustion by the admission into the head or combustion end of the cylinder of a fresh charge, are concerned, and the present invention is particularly directed to certain improvements in a similarly operating structure forming the subject of an application for patent filed by Edmund Willson Roberts, August 13, 1920, under Serial No. 403,194.

One object of my invention is to provide a portable, easily handled, and manually controlled tool of the impact hammer type with simple and efficient means whereby an explosive mixture may be drawn into the cylinder, compressed, transferred externally of the cylinder to the explosion chamber where it is finally compressed, and subsequently exploded to forcibly and rapidly impel the piston-hammer at a constantly increasing speed, particularly during the latter part or portion of the working stroke for the purpose of imparting powerful percussive blows to a drill-bit, chisel, or the like.

A further object of my invention is to provide improved means for returning the piston-hammer after it has delivered its blow, and more specifically to provide a rotor cooperating with the piston encircling the cylinder, rotating in a plane at right angles to the longitudinal axis of the cylinder, and having a cam the surfaces of which cooperate at different portions of the travel of the piston-hammer with rollers carried by said piston-hammer. A further object of my invention is to provide a rotor for effecting the return compression or non-working stroke of the piston, and after the machine has been set in motion, to effect a continuous rotation of said rotor, at a substantially constant angular velocity by the operative engagement of the piston, through the rollers, with the cam surfaces of such rotor during the first part or fraction only of the forward power movement of such piston-hammer.

A further object of my invention is to provide a construction wherein a piston-hammer, impelled throughout its forward, working, or impact stroke, at a constantly increasing or accelerated linear speed, by the explosion of a gaseous mixture, shall impart to a rotor during the first part, portion or fraction of said stroke, energy sufficient to keep said rotor rotating at a constant angular velocity; wherein said piston shall travel the balance of its said impact or working stroke out of operative engagement with said rotor; and wherein the energy so imparted to and stored in said rotor shall be sufficient to bring said rotor back into operative re-engagement with said piston at the completion of said impact stroke, and the continued rotation of said rotor shall cause said rotor to move said piston throughout the return or non-working stroke thereof.

A further object of my invention is to provide a construction wherein the piston-hammer shall be propelled, through a substantial part of its working, power, or impact stroke without impedance by or from the rotor, so that particularly during the latter half, part, portion or fraction of said stroke, and up to substantially the moment of impact of the piston with the drill-bit, chuck or tool, the piston-hammer shall be freely impelled at a constantly accelerated linear speed by the explosive force of the ignited fuel, the linear speed of said piston-hammer being highest at or about the moment of impact.

A further object of my invention is to provide a rotor with a fly, balance or momentum wheel which is large enough in diameter to encircle the cylinder and to form a rim to encircle the blades of a fan for cooling the cylinder, and, at the same time, not heavier than is necessary to provide energy to effect the compression stroke of the engine. In other words, my object is to provide a balance wheel large enough to encircle the outer ends of the fan for cooling the cylinder, strong enough to withstand the centrifugal force developed therein when revolving at the high speeds at which the machine is operated, and yet not so heavy as to add unnecessary weight to the machine as a whole.

A further object of my invention is to provide simple and efficient means disposed externally of the cylinder for transferring charges of an explosive mixture from the intake to the explosion end of the cylinder.

A further object of my invention is to provide the cylinder or other relatively fixed portion of the structure with a contact-maker and to provide the rotor or rotative member with actuating means therefor; such contact-maker being adjustable on said fixed part, whereby said device may be positioned as desired to advance or retard the explosion as conditions may require.

A further object of my invention is to provide my improved impact tool with handles whereby it may be carried and supported when in action; and to provide such handles, or the end of the structure adjacent thereto, with means for controlling the admission of gas to the cylinder and for adjusting the position of the contact-maker.

A further object of my invention is to provide the tool-receiving end of the cylinder with a freely movable impact-receiving member or strike-pin suitably held in the cylinder against displacement, and adapted to transmit the blows delivered to it by the piston-hammer to the head of a tool carried in a chuck having a resilient connection with the end of such cylinder.

A further object of my invention is to provide a unitary piston-hammer, having a heavy striking end or hammer head, a solid central portion provided with a cross-head pin carrying rollers which cooperate with the cam surfaces of the rotor, and a rear hollow piston head provided with packing-rings; the said hammer head being also provided with packing-rings to prevent leakage of the incoming charge past such striking end.

A further object of my invention is to provide means for venting any body of non-explosive fluid or over-saturated mixture which may be present in either the inlet or explosion chambers, due to improper mixture of the explosive body or improper operation of the structure.

A further object of my invention is to provide simple and efficient means for lubricating the rotor and its bearings, and the rollers engaging the cam of the rotor.

A further object of my invention is to provide a guard partially or completely enclosing the improved tool and its associated parts; such guard facilitating handling and serving to protect the operator and prevent injury to the tool when the same is not in use.

And a still further object of my invention is to provide a structure of the described type whose parts may be readily and easily assembled.

These and other features of the improved structure forming the subject of my invention are more fully described hereinafter; reference being had to the accompanying drawings, in which:

Fig. 2, is an elevation at right angles to Fig. 1, partly in section on the line II—II, Fig. 1.

Fig. 3, is a plan view of the upper portion of my improved impact tool.

Figs. 4, 5, 6 and 7, are sectional plan views on the lines IV—IV, V—V, VI—VI and VII—VII, Fig. 1, respectively.

Fig. 8, is a view illustrating the cam elements of the rotor developed in a flat plane and illustrating, diagrammatically, the position of one roller of the cross-head pin in relation thereto during the respective strokes of the piston-hammer.

Figure 1:
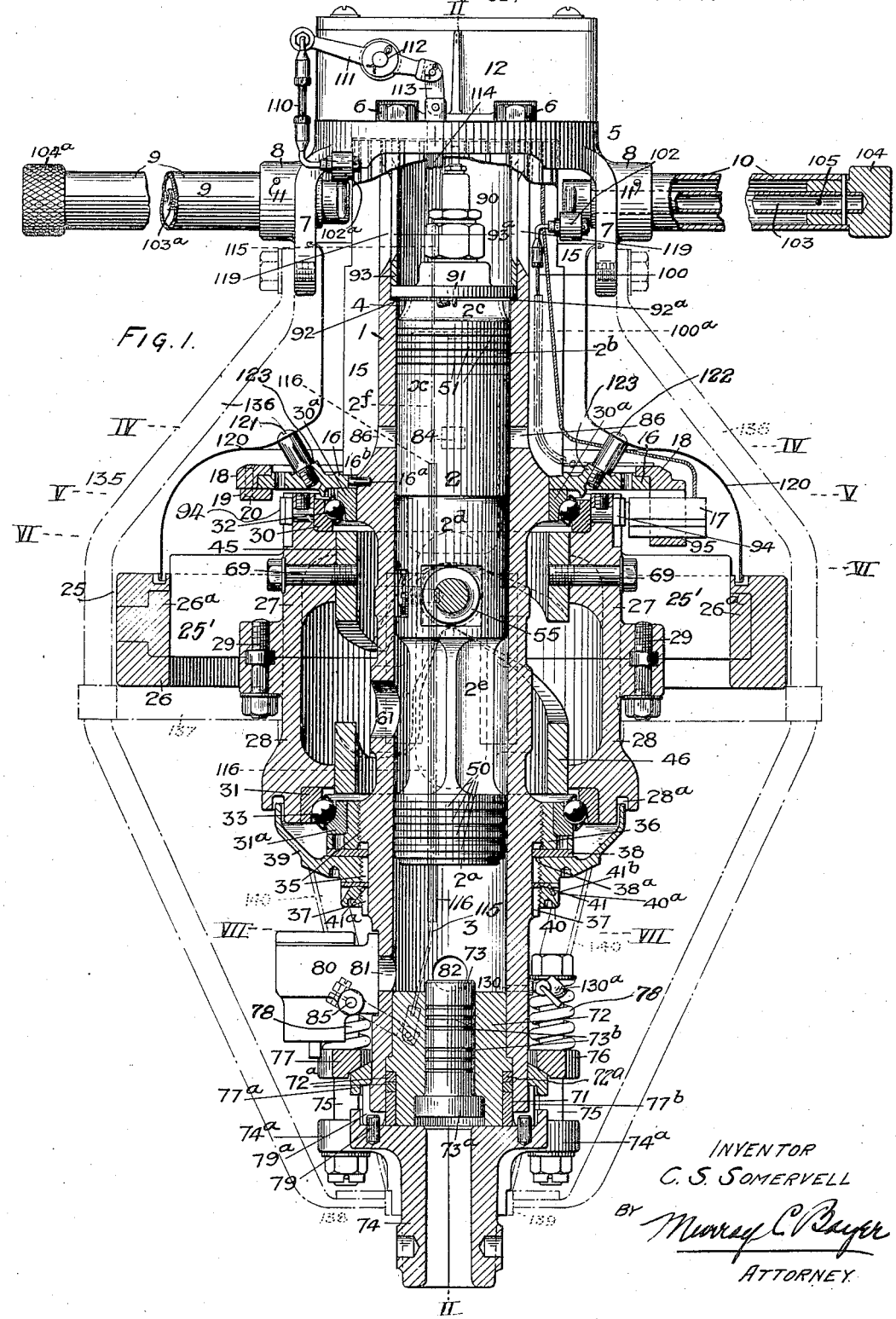
Figure 1, is a view in elevation, partly in section on the line I—I, Fig. 2, of an impact tool of the explosive type embodying the features of my invention, showing the piston-hammer in the retracted position.

In Figs. 1 and 2 of the drawings is shown a cylinder 1, having a through bore, and a unitary piston-hammer 2, adapted to reciprocate within the bore of said cylinder; such piston-hammer providing, with the cylinder, intake and explosion chambers 3 and 4, respectively, at the opposite ends of the same.

The upper end of the cylinder may receive a cap 5, which may be held in place by a series of bolts 6, entering the end wall of the cylinder. On opposite sides of said cap, depending ears or lugs 7, may be provided, having apertured bosses 8, adapted to receive handles 9 and 10, which may be secured in place by pins 11. The cap 5 may carry a spark coil box 12, in which may be located certain elements of the ignition system whereby the explosive charges may be fired.

Figure 4:
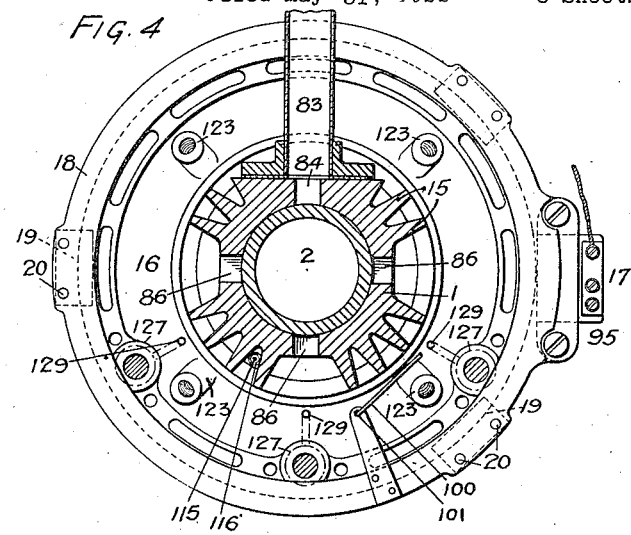
Figure 9:
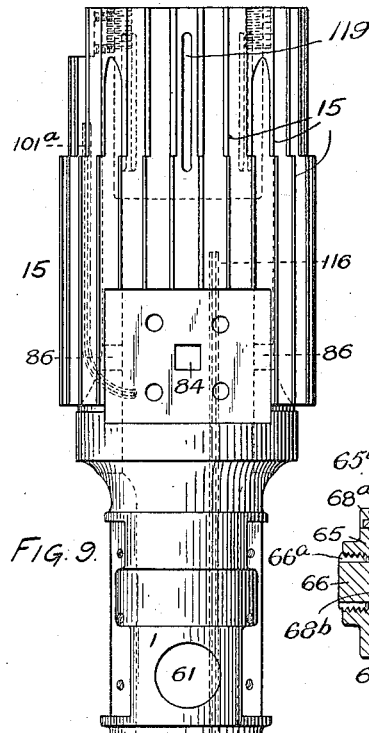
Fig. 9, is a detached view of the cylinder, stripped of the parts associated therewith.
Figure 10:
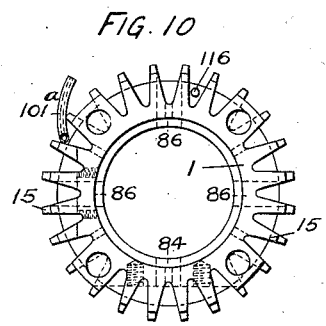
Fig. 10, is a plan view of the upper end of the cylinder as illustrated in Fig. 9.

The upper end of the cylinder may be ribbed as clearly indicated in the drawings, and particularly in Figs. 4, 9 and 10, the individual fins 15, being relatively thin so as to effectively dissipate the heat due to the explosion of the gaseous mixture. Below the fins, which are preferably shouldered to provide a close fit, I may secure to the cylinder an annular plate or disk 16, arranged to support a contact-maker 17, more fully described hereinafter; the latter being carried by a ring 18, supported by the plate 16, and circumferentially adjustable with respect to the same and to the axis of the cylinder 1. For this purpose I may secure to the underside of the ring 18, a series of clamps 19, which may be riveted at 20, to said ring 18. The means for effecting adjustment of this ring 18, for the purpose of advancing or retarding the spark, are hereinafter described.

Rotatably mounted with respect to the cylinder and disposed substantially midway the ends of the same, is a rotor, comprising a fly-wheel 25, which may comprise a rim 26, and a hub formed in two sections, 27 and 28, respectively, which sections may be secured together by stud bolts 29. To lighten the fly-wheel, it may be provided with an aluminum core, indicated at 26$^a$. This fly-wheel is arranged to rotate on anti-friction bearings carried by the cylinder, and these bearings may be arranged as follows:

The upper and lower sections of the hub carry upper and lower rings 30 and 31, respectively, between which and rings 30$^a$ and 31$^a$, respectively, supported by the cylinder, anti-friction balls 32 and 33 may be arranged to provide the desired bearings. The upper ring 30$^a$ may have a driving fit with the cylinder, and may directly underlie the ring or plate 16.

The lower portion of the cylinder may be threaded at 35, for the reception of a collar 36, carrying the ring 31$^a$, and this threaded portion may be grooved on opposite sides of the cylinder as indicated at 37. In engagement with the collar 36, is a lock plate 38, which may have inwardly disposed lugs 38$^a$, adapted to engage the grooves 37. Below the lock plate 38 and also adapted to the threaded portion 35, I may provide an annular cupped member 39, which may serve as a lubricant receiver, and may be held in place by a lock nut 40, between which and the hub of said cupped member a lock washer 41, may be interposed; the latter having inwardly disposed lugs 41$^a$ fitting the grooves 37, and outwardly disposed lugs 41$^b$, one or more of which may be turned down into one or more of the recesses 40$^a$, disposed at intervals throughout the outer surface of said lock nut 40. To avoid splash or accidental discharge of the lubricant, as well as to protect the bearings from dirt and dust, the lower section 28 of the fly-wheel hub may be annularly grooved at 28$^a$, to receive the outer edge of the cupped member 39.

Carried by the hub of the fly-wheel are a pair of cam elements 45 and 46, which are shown developed in a flat plane in Fig. 8, and these cam elements, each provided with cam surfaces of special contour, constitute, with the fly-wheel, a rotor, to which motion is imparted by the piston-hammer when moving through the first part or portion of its power stroke. The rotor by reason of the kinetic energy thus stored in the fly-wheel, continues to rotate about its axis at a substantially fixed angular velocity or speed of rotation and is arranged to effect the retractive or return movement or compression stroke of the piston-hammer.

The piston-hammer 2, which I prefer to employ, and which is driven on its power stroke by the explosion of a gaseous mixture within the chamber 4, has a solid and relatively heavy hammer-head or hammer-piston 2$^a$, which is provided with packing-rings 50, to prevent leakage of the charge being compressed in the chamber 3 and then transferred to the explosion end of the cylinder when the piston-hammer is moving on the power or impact stroke.

The power-piston 2$^b$ of the piston-hammer is also provided with packing rings 51, to prevent leakage, and the end of this head is preferably provided with the usual baffle 2$^c$ for deflecting the incoming new charge away from the exhaust ports. The power piston 2$^b$ is preferably hollow and is provided at its lower end with a rigid hollow cylindrical extension 2$^d$ of slightly smaller exterior diameter than the piston 2$^b$. The lower end of said extension 2$^d$ is preferably originally made solid and is subsequently transversely bored to form a hole 56 for the reception of the cross-head pin 55. The lower end of the said piston extension 2$^d$ is substantially midway between the ends of the piston-hammer 2 and is rigidly connected to the hammer-piston 2$^a$ by an integral solid section, 2$^e$ preferably cruciform in cross-section.

The greater portion of the piston-hammer 2 is of an integral piece of metal, preferably formed into the shape shown in the drawings. The hammer-head or piston 2$^a$ may be hardened. The head 2$^f$ of said piston against which the explosive force is directed, may be of soft steel and is initially formed independently of the balance of the piston. It is preferably welded to the balance of the piston at the point $x$, as more clearly illustrated in the sectional view, Fig. 2. The power piston 2$^b$ is provided with the chamber 2$^f$ to make the reciprocating piston-hammer as light as is consistent with the work to which the tool is to be subjected.

Figure 12:
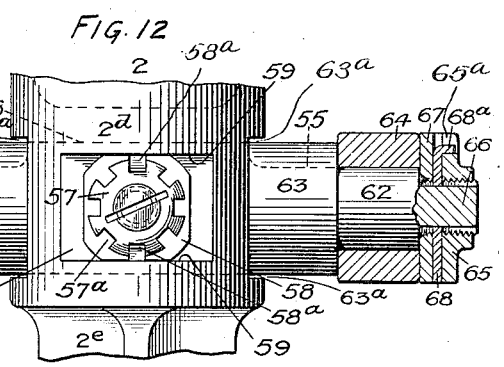
Fig. 12, is an enlarged view of a portion of the piston-hammer, showing in detail the cross-head pin and the rollers carried thereby.
Figure 13:
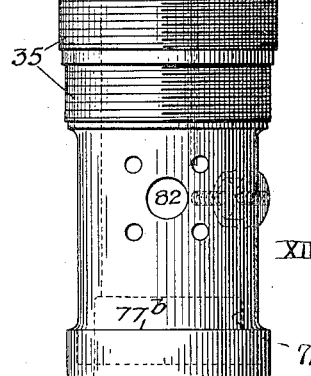
Fig. 13, is a sectional view of the mixing-valve, on the line XIII—XIII.

The cylinder is slotted intermediate its ends on opposite sides to provide guide-ways 52, and the walls of these guide-ways are preferably provided with wear-plates 53, which may be held in place by suitable screws 54; such wear-plates constituting slide-ways. The cross-head pin 55 is adapted to travel back and forth in these guide-ways as hereinafter described. Said pin is tightly fitted into the opening 56, through the solid lower end of the extension $2^d$ of the power piston, and is secured in place by a lock screw 57, having a locking washer 58; the latter having a lug (or lugs) $58^a$, which may be bent into engagement with one or more of a series of notches $57^a$, formed in the head of said lock screw. The locking washer is held against movement by shoulders 59, on the piston which may be formed by providing the piston around said screw with a groove 60 having a flat bottom and abrupt shoulders or sides. (See Fig. 12.)

The cross-head pin is placed in and secured to the piston-hammer after the latter has been assembled in the bore of the cylinder; said pin being passed through the guide-way slots 52 of the latter, and through the hole 56 in the piston extension $2^d$. After it has been properly so positioned, it is secured in place by the lock screw 57. In order that this screw 57 may be applied, the cylinder is provided with an aperture located preferably midway between the guide-ways 52. It will be understood, of course, that the piston-hammer and the cross-head pin 55 are assembled in the cylinder and the lock screw 57 is applied, to hold the cross-head pin 55 from longitudinal or rotary movement with respect to the piston-hammer, before the fly-wheel hub 26—27 carrying the cam elements 45 and 46 are positioned and secured together around the cylinder. While I have shown a circular aperture 61, to provide for the insertion of the lock screw 57, it is obvious that the contour is unimportant and that a cross slot or other form of aperture may be employed, if desired, and that such slot may connect with one of the guide-way slots 52.

The ends of the cross-head pin are preferably reduced to form axles or studs 62, upon which pairs of rollers 63 and 64, are rotatably mounted; the rollers 63 being arranged to engage the wear-plates 53 forming the slide-ways of the guide slots 52, while the rollers 64 are arranged to engage the surfaces of the cam sections 45 and 46, carried by the hub sections of the fly-wheel. The piston-hammer may be flattened at $63^a$ (see Fig. 12) by grooving the same to accommodate the rollers 63, and these several rollers may be held in position by nuts 65, adapted to threaded ends 66, of the studs or axles 62, with washers 67, and locking plates 68, interposed between said nuts and the rollers 64; the locking plates 68 having inwardly disposed lugs $68^b$, adapted to engage grooves $66^a$ formed in the threaded ends 66, and outwardly disposed lugs $68^a$ adapted to engage notches $65^a$, formed in the edges of the nuts 65. (See Fig. 12.)

The cam elements 45 and 46 may be secured to the hub sections 27 and 28, by bolts 69, and in addition the hub sections may be provided with dowels 70, adapted to enter openings $70^a$, in the cam elements and serve as positioning means when setting or resetting said cam elements. The cam elements are preferably of hardened metal, and their engaging faces may be disposed in a plane at right angles to the longitudinal axis of the cylinder.

In Fig. 8, I have illustrated the cam elements 45 and 46, employed with my improved impact tool, developed in a single plane. On examining this view, it will be observed that the path X between the cam elements 45 and 46 is duplex in character; that is to say, it is repeated at diametrically opposite sides with exactly the same outline or contour, for the passage of the rollers 64, carried by the cross-head pin 55. The lower cam element 46, which is the only cam element operative when the piston-hammer is automatically reciprocated in the cylinder, is provided with relatively sharp inclined portions, indicated at $a$, which are relieved at $a'$, and are followed by the straight portions $a^2$ and the relatively obtuse portions indicated at $b$, whose inclination to the horizontal may be substantially one-half that of the inclination of the surfaces $a$. These several portions or surfaces $a$, $a'$, $a^2$, and $b$, are duplicated at diametrically opposite positions, as clearly shown in the drawing, and the high points of the surfaces of the cam element 46 are indicated at $c$.

The cam element 45, which forms the opposite wall of the cam path X, is provided with the respective surfaces $d$, $d'$, and $d^2$, duplicated at opposite sides of the same for cooperative engagement with the rollers 64 of the piston-hammer in starting the automatic operation of the mechanism, as hereinafter set forth; the surfaces $d'$ being disposed substantially opposite the surfaces $a$ of the cam element 46, while the surfaces $d^2$ and $d^3$ are substantially opposite the surfaces $b$ of the cam element 46.

As both rollers 64 are in engagement with the respective surfaces $a$ and $b$ of the cam element 46 at the same time, there will be two complete reciprocative movements of the piston or hammer 2, with two power strokes thereof, for each revolution of the rotor.

While I have shown and described the arbors or studs 62 as provided with rollers for engaging the wear-plates 53, and the surfaces of the cams 45 and 46, it is obvious that they may be omitted without departing from my invention.

The bore of the cylinder at the lower end 71 of the same may be slightly enlarged, to receive a shouldered sleeve, bushing or anvil 72, preferably packed as indicated at 72ª, which bushing in turn receives an impact member or strike-pin 73, upon which the blows of the piston-hammer are normally delivered. The said impact member 73 is held against inward displacement by a head 73ª, and its stem may be grooved at 73ᵇ so that oil collecting in the same will form a seal and prevent leakage of the charge when the charge is being compressed and transferred by the piston-hammer on its power stroke. I provide a tool chuck 74, which preferably engages the lower end of the bushing 72, and is held in position against the lower end of the cylinder by bolts 75; the latter passing through ears 74ª, carried by the chuck 74, and ears 76, carried by a collar 77, supported on a ring 77ª engaging a shoulder 77ᵇ, of the cylinder; springs 78, being interposed between said ears 76, and the heads of said bolts. The chuck 74 may be held against rotative movement by means of pins 79, entering notches 79ª, formed in the end of the cylinder.

Suitably supported at the side of the cylinder 1, opposite the chamber 3, thereof, is a mixing valve or carburetor 80, receiving a supply of gaseous material from any suitable source, which, with the combined air admitted to said valve, is drawn into the chamber 3 of the cylinder through an aperture 81, formed in the wall of the same, on the retractive stroke of the piston 2. On the power stroke of the piston, the mixing valve is automatically closed and the indrawn charge is compressed until the piston 2ᵇ clears the port 84, whereupon the charge is forced from such chamber 3, through a port 82, conduit 83, which may extend externally of the structure, and port 84, into the explosion chamber 4. Admission of gas to the mixing valve is controlled by a needle valve 85, and the position of this needle valve is under the control of the operator, in a manner hereinafter described.

As shown in the present instance, the pipe 83, extends outside the fly-wheel 25. The inlet port 84, may be rectangular in shape. The cylinder is provided with exhaust ports 86, which may be formed in substantially the same plane as the inlet port 84.

For the purpose of providing a spark whereby the compressed explosive charge may be ignited, the upper end of the cylinder may be provided with any usual form of spark plug indicated at 90. In the present instance, the spark plug is shown as mounted on and extending through a plate 91, which forms the cylinder head and the end of the explosion chamber 4; said plate resting upon a shoulder 92, formed by enlarging the end of the cylinder, with interposed packing 92ª to insure a tight chamber. The plate 91, may be held in place by a sleeve or bushing 93, secured in the cylinder by the cap 5, which is confined in place by the bolts 6.

Figure 5:
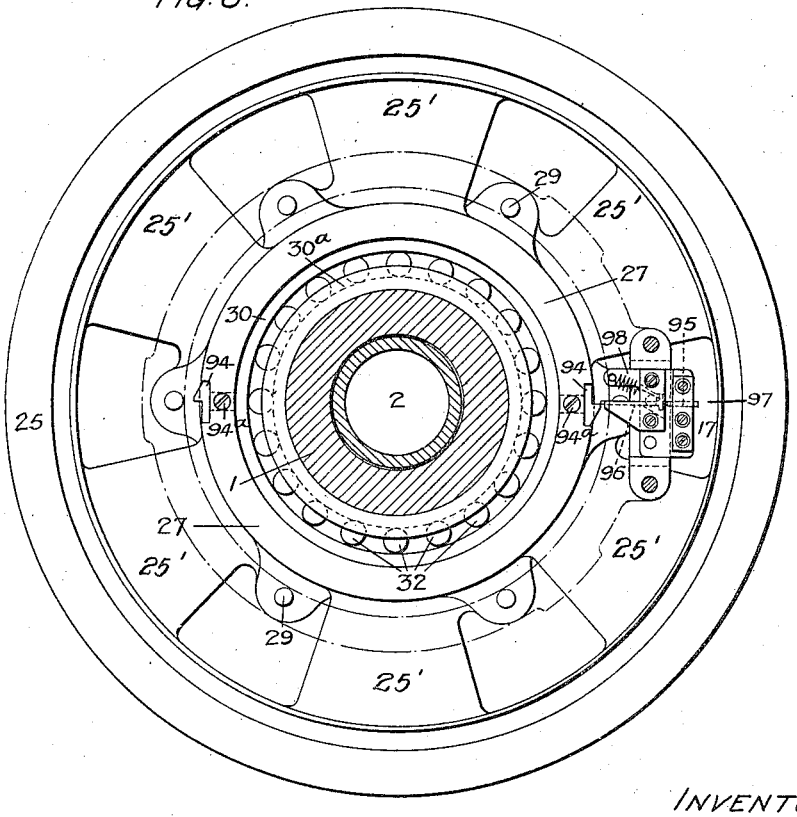

The disk or plate 16, which may be secured to the cylinder against rotation by means of a pin 16ª, entering a recess 16ᵇ, therein, carries a contact-maker or make and break mechanism whereby a spark is formed; one form of such mechanism which I may employ being illustrated in the plan views, Figs. 4 and 5. As clearly shown in these views, the upper section 27, of the fly-wheel hub may be provided on its outer surface with detachable cam projections 94, which may be secured in place by screws 94ª. Carried by a bracket 95, suspended from the disk or plate 16, are a pair of contacts in proper electrical connection with the spark plug and a spark coil located in the box 12; such contacts when brought into engagement closing the circuit which, when broken, effects formation of the spark.

The contact 96 is movable with respect to the bracket 95 and contact 97 is fixed with respect to the bracket 95. The contact 96 is held in position to be engaged by the cam projections 94, by a spring 98; such contact 96 being mounted for sliding engagement with respect to the contact 97, and being moved into engagement therewith when engaged by the cam projections 94. The moment a cam projection 94 passes the contact element 96, the latter will be restored to its normal position free from engagement with the contact 97 by the spring 98, and as this engagement is broken, a spark will be formed between the points of the spark plug to ignite the explosive charge in the chamber 4. In addition to its sliding movement, the contact element 96 may be pivotally mounted so that should the fly-wheel reverse its movement at any time for any cause, the cam projections 94 will simply move such contact element 96 on its pivot— out of the way—without the formation of a spark and without injury thereto.

The ring 18 supporting the contact-maker may be circumferentially or otherwise movable with respect to the disk or plate 16 supporting the same for the purpose of advancing or retarding the spark. To effect movement of the contact-maker, I may provide a wire or equivalent element 100, one end of which may be connected to the disk or plate 18 at the point 101, while its opposite end (see Fig. 1) may be connected to an arm 102, carried by a rod 103, axially disposed in the handle-bar 10, and oscillable within the same. This rod 103 carries at outer end a knurled member 104 (see Fig. 3), journaled in the handle-bar 10, which member may be moved by the hand of the operator; said rod having a projecting stud or pin 105, adapted to seat in notches 106, at opposite ends of a slot 107, formed in the wall of the handle-bar 10. The wire 100 may be guided by the tube 100ª and is of such a character that it may lie in a bent position and impart movement in both directions to the ring 18 when the arm 102 is moved by oscillating the rod 103. To advance the spark, the rod 103 is turned in the direction of the arrow, shown at the right hand end of Fig. 3.

The needle valve 85, controlling the admission of gas to the mixing valve may be operated by mechanism similar to that employed for adjusting the position of the spark-timer. For this purpose the handle-bar 9 (see Fig. 1) may carry an oscillable rod 103ª, mounted in the same manner as the rod 103, and carrying at its outer end a knurled member 104ª, journaled in the handle-bar 9, which may be moved by the hand of the operator. At its inner end, the rod 103ª may be provided with an arm 102ª, which may be connected by means of a link 110, with a lever 111, pivotally mounted at 112, on the coil box 12, and said lever 111, is in turn connected by a link 113, to an operating member 114.

Figure 14:
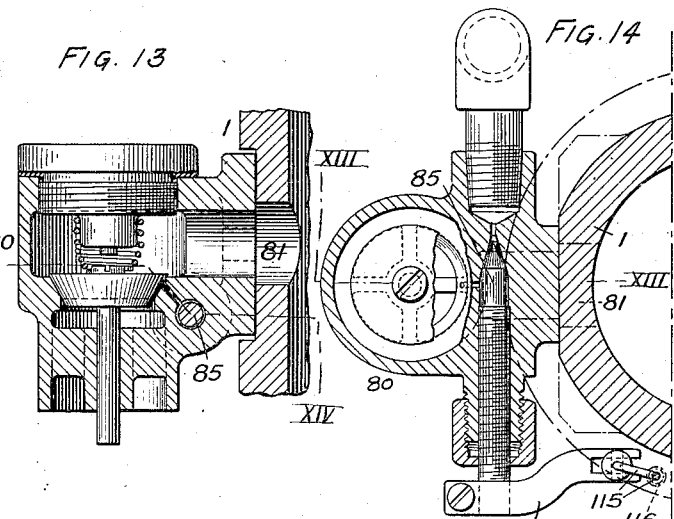
Fig. 14, and Fig. 14, is a sectional view on the line XIV—XIV, Fig. 13.
Figure 11:
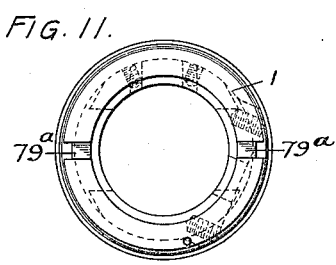
Fig. 11, is an inverted plan view of the lower end of the cylinder.

The operating member 114 may be connected to one end of a wire 115, arranged to pass through a guide tube 116 (see Figs. 1, 7 and 14), carried by the cylinder; the opposite end of said wire being connected to a radial arm 85ª of the needle valve 85 controlling admission of gas to the mixing valve or carburetor 80. The rod 103ª may have a projecting stud or pin 105ª (see Fig. 3) adapted to seat in notches 106ª at opposite ends of a slot 107ª, formed in the wall of the handle-bar 9. The wire 115 is guided by the tube 116, and is of such a character as to impart movement in both directions to the needle valve 85, when the rod 110 is oscillated through the means described. To operate the needle valve 85 so as to regulate the amount of gas admitted past the same, the rod 103ª is turned in the direction of the arrow shown at the left hand end of Fig. 3. In lieu of such arrangement, I may mount on the head of the tool, independently of the handle, mechanism for effecting any desired adjustment of the needle valve.

In addition to providing the cylinder with a ribbed portion surrounding the explosion chamber, formed by the fins 15, for the purpose of dissipating the heat generated in such chamber, the cylinder may be slotted between the fins for the passage of air, as indicated at 119, and those slots may be continued through the sleeve 93, as indicated at 93ª.

For the purpose of providing a channel for the passage of air drawn down by the blades 25' of the fly-wheel to cool the cylinder, and to protect the spark-timer mechanism from injury by dirt and moisture, I may employ an enclosing hood 120, which may be secured to the cylinder at its upper end and stayed by the plate 16; suitable fastening means, such as screws, indicated at 121, being employed for the purpose, and the plate 16 having bosses 123 receiving the screws 121.

Adjacent the upper portion of the hood, I may provide an oil receptacle 125, with a tubular outlet 126, which may be secured to and supported by the plate 16; the latter having an apertured boss 127 receiving the same (see Fig. 4). The tubular outlet 126 may be provided with a valve 128 and with a cam lever 128ª to operate the valve and a delivery tube 129 may pass therefrom through the plate 16, so that lubricant may discharge onto the upper ball bearing 30, 30ª and 32; the drip therefrom passing to the cam elements 45 and 46, and onto the lower ball bearing 31, 31ª and 32 and any lubricant dripping from this bearing passes into the lubricant-receiver 39. In order that the rollers 63 and 64 may receive lubricant, the cam element 45 may be provided with openings 45ª, through which lubricant passing from the upper bearing may find its way onto said rollers. The lubricant-receiver is preferably provided with a pet cock 39ª so that it may be emptied from time to time.

Should the inlet or compression chambers 3 and 4, respectively, contain non-explosive fluid, or over-saturated mixture, occasioned by improper mixture of the explosive body or improper operation of the structure, it is necessary to drain the same from said chambers. For this purpose, said chambers may be provided with apertures 130 and 131 respectively; such apertures being normally closed by pet cocks 130ª and 131ª, which may be opened at any time to drain these chambers of fluid.

I preferably provide my improved impact tool with a guard 135, which may comprise tubular members 136, hung from the ears 7 of the cap member 5, which tubular members may be connected to an annular member 137, disposed adjacent the fly-wheel, and connected at their lower ends 138, to a ring 139, which may be carried by the chuck. In addition, I may provide straps 140, between the annular member 137 and said ring 139. Such guard serves to protect the external conduit 83 for the passage of gas to the explosion chamber; it provides a convenient rest for the tool when not in use; it affords additional means for transporting the tool at any time and not only protects the moving parts from injury, but also protects the operator from injury by such moving parts.

In addition, by making a portion of such guard tubular, it serves to carry the wires leading to the coil-box and timer mechanism, thereby protecting such wires from injury, and it provides a support for the application of starting mechanism which may be employed with my improved tool.

The cam elements 45 and 46, are of special contour and have been designed with a view of permitting the piston-hammer to have substantially free and unobstructed movement on its power stroke. Certain surfaces of the cam 46 cooperate with the rollers 64 carried by the cross-head pin 55 for the purpose of retracting the piston-hammer on its non-working stroke. The cam element 46 is substantially the only cam element which is in engagement with the roller 64 or is in operative engagement with the cross-pin 55 when the mechanism is automatically operating. The cam 45 cooperates with the said rollers 64 only in starting the machine, at which time its operation is to force the piston hammer downwardly (in the same direction as the working stroke) to compress the charge in the chamber 3 and to transfer it to the explosion chamber 4 when the piston-hammer nears the end of said stroke.

As may be readily understood the power stroke of the piston-hammer should be so related to the operation of the rotor provided with the cam elements that while a portion of this energy may be and is intended to be exerted at the very beginning of the power stroke to effect the rotative movement of the rotor, the greater part of this energy is available for imparting an effective blow to the drill-bit.

Those surfaces $a$ of the cam 46 which have the greater angularity or steepness are the surfaces which are positively engaged by the roller 64 on the power stroke of the piston-hammer and those surfaces $b$ of the cam 46, which have less angularity, are the ones which engage the rollers 46 to effect the return or compression stroke of the piston-hammer. Fig. 8 makes it plain that the piston-hammer is in operative engagement with the surfaces $a$ only during the first part or portion of the power stroke. Since the rotor is revolving at a substantially constant angular speed about its axis, the length of time that the piston-hammer is in operative engagement with the cam 46 is very short as compared with the length of time that it is in engagement with the less inclined or slower portion $b$ of the said cam. After the piston-hammer moves out of operative engagement with the portion $a$ of the cam 46, its free forward movement is not impeded by the cam, and the piston-hammer is therefore impelled at a constantly increasing speed throughout the latter half or portion of its working stroke, practically up to the moment of its impact against the impact member. This is of great importance and insures a most effective blow of the piston-hammer against the impact member.

The timed relation of the explosion with respect to the position of the piston-hammer and the position of the cam elements carried by the rotor, is such that a spark will be made and an explosion occur when the piston-hammer is in position to change the direction of its reciprocative movement. While this may occur just before the rollers 64 pass over the high points $c$ of the cam element 46, it will be understood that the momentum of the rotor is such as to carry the high points of said cam element past the rollers of the piston hammer, even though the explosion may take place in advance of this position. The force of this explosion drives the piston-hammer forward and as it is prevented from rotating by reason of the engagement of the rollers 63 of the cross-head pin with the wear-plates 53 in guide ways 52 in the cylinder, the rollers 64 carried by said cross-head pin react upon the steep surfaces $a$ of the cam element 46, and cause the rotor to revolve.

The continued rotation of the rotor is maintained by the momentary engagement of the rollers 64 with the surfaces $a$ of the cam element 46 on the successive power strokes of the piston-hammer.

The length of these surfaces $a$ is relatively small; that is to say, substantially one-half of the length of the stroke. The recesses $a'$ are so arranged that after leaving the surfaces $a$, said rollers are instantly out of engagement with the cam element 46 in order that nothing may prevent the piston-hammer from traveling the balance of its power stroke at a constantly increasing or accelerating speed up to the time of impact.

In the formation of this cam path the cam element 46 is cut away sufficiently at $a'$ to insure that during the latter part of each power stroke of the piston-hammer there will be no actual contact of the rollers 64 with the wall of said cam element 46. In addition, the cam element 46 is formed with a substantially straight portion $a^2$ so as to provide a momentary dwell of the piston-hammer after it has struck the blow. Should there be any recoil or rebound of the piston-hammer, after striking the blow, the distance $X'$ between the cam 46 and the cam 45 will be sufficient to permit the rollers 64 to rise without engaging with the upper cam element 45. The surface $d^3$ may be curved upwardly as indicated, or even dispensed with to insure sufficient space to prevent contact. As the rotor is in continuous motion at a constant angular speed of rotation, it will be understood that it will have moved several degrees before the surfaces $b$ of the lower cam element 46 will re-engage the rollers 64, to effect return or retractive movement of the piston-hammer.

The surfaces $d$ of the upper cam element are disposed in such relation to the position assumed by the rollers 64 when the piston hammer reaches or nears the end of its retractive movement as to be out of contact therewith, the pressure of the charge under compression in the chamber 4 before explosion and the pressure of the ignited gas after explosion being such as to hold the rollers 64 against the surfaces $b$, $c$, $a$, of the cam element 46, and out of engagement with the surfaces $d$, $d'$ and $d^2$ of the cam element 45. The surface $d'$, substantially opposite the surface $a$ of the cam 46, is preferably disposed at a slightly different angle than that of the surface $a$ of the lower cam element, so that while the path afforded by the cam 45 between the points $d$ and $d'$ closely approximates that through which the piston passes on its working stroke ample clearance is provided between the rollers 64 and the upper cam 45 during that portion of the stroke. It will thus be seen that the only portions of the cam 45 which are depended upon to give downward movement to the piston during the starting operation are the parts $d$, $d'$. When the rollers are forced under the surface $d'$ of the cam 45, the piston will continue to move downwardly, under momentum, until the head $2^b$ clears the ports 84 and 86, whereupon the pressure in the compression chamber 3 will be relieved and the compressed gas will be transferred into the explosion chamber 4. After this transfer has taken place the compression stroke is performed by continuing to manually rotate the fly-wheel, which brings the portion $b$ of the cam 46 into operation to effect the compression stroke and compress the explosive mixture in the explosion chamber 4. The form of the cam surface of the cam element 46 might be considerably changed from that shown in Fig. 8 of the drawing since the only part of the cam which is absolutely necessary in starting the machine to effect the compression of the charge in the inlet chamber and the transference of it to the explosion chamber is that indicated as $d$, $d'$ in Fig. 8.

The surface $d^3$ of the cam which is next adjacent the surface $d'$ thereof is preferably cut away to provide ample space between the surface $d^3$ and the surfaces $a^2$ and $b$ within which the roller or cross-head may move freely vertically whenever there is a rebound to the piston-hammer after the blow has been struck.

It will be observed, therefore, that the lower cam element 46 only, cooperates with the roller 64 after the tool has started to operate, and that during operation, the upper cam element 45, relatively speaking, performs no fuction except that in some instances it may stop the rearward movement of the piston-hammer if, for any reason the cushioning effect of the charge being compressed should be reduced. In starting, however, the presence of this upper cam element is most improtant since during the cranking operation, that is to say, rotation of the fly-wheel by hand, movement of the rotor is caused to effect forward movement of the piston or hammer on what would be, were the structure in operation, the power stroke, whereby a charge may be compressed in the chamber 3 and delivered to the explosion chamber 4 for subsequent ignition.

It will be further observed that the sudden drop $a'$ in the cam element 46 causes the said element, and with it the whole rotor, to move completely out of operative engagement with the piston-hammer immediately after the momentary engagement of the said roller 64 with the surfaces $a$, so that the piston-hammer is entirely free to strike a most effective blow; that under the force of the expanding gases at the combustion end of the cylinder up to the very moment of impact of the piston-hammer against the impact member the piston will be impelled particularly during the last half, fraction, part, or portion of its travel at a constantly increasing linear speed; that the space between the cams is so widened at a point corresponding to the moment of the impact that any recoil of the piston-hammer will not bring the rollers 64 into engagement with the upper cam 45 and that the recoil, if any, will not result in any lost motion of the piston-hammer because the rapid rotation of the rotor immediately brings the portions $b$ of the cam element 46, into engagement with the rollers 64, for the purpose of retracting the piston-hammer on the non-working or compression stroke.

In the operation of the improved impact tool above described, the piston-hammer will make its forward or power stroke during approximately 30° of rotative movement of the fly-wheel, and its return stroke in approximately 150° of said rotative movement. The retractive or compression stroke of the piston will be effected by the rotor which moves continuously under the impulses imparted thereto by the piston-hammer during the first part, portion, half or fraction of its working stroke.

While I have shown with some particularity certain elements of construction and certain design or arrangements of parts for carrying out the function of my improved structure, it will be understood that such construction is susceptible of modification in various particulars without departing from the spirit and scope of my invention.

I claim:

1. In an impact tool of the explosion type, the combination of a cylinder having a through bore, a piston-hammer slidably mounted in the bore of said cylinder, means for imparting movement to said piston-hammer in one direction only by an explosive force whereby said piston-hammer may be brought into forcible engagement with a tool bit or similar element, a rotor encircling the cylinder and journaled thereon, and comprising a fly-wheel and a cam element carried by said fly-wheel, and a cross-head carried by the piston-hammer and having ends projecting through the wall of the cylinder for cooperation with said cam element whereby the latter may effect movement of the piston-hammer in one direction; said cam element being so related with respect to said cross-head as to permit rapid movement of the piston-hammer on its power stroke and receive its impetus therefrom and to impart a relatively slower movement to said piston-hammer on its non-working stroke; the movement of said fly-wheel being continuous at one speed.

2. In an impact tool of the explosion type, the combination of a cylinder having a through bore, a piston-hammer slidably mounted therein, means for imparting movement to said piston-hammer by an explosive force in one direction only whereby said piston-hammer may be brought into forcible engagement with a tool bit or similar element, a rotor encircling the cylinder and journaled thereon, and comprising a cam element carried by said rotor, and a cross-head carried by the piston-hammer and having ends projecting through the wall of the cylinder for cooperation with said cam element whereby the latter may effect movement of the piston-hammer in one direction; said cam element being so related with respect to said cross-head as to permit rapid movement of the piston-hammer on its power stroke and receive its impetus therefrom and to impart a relatively slower movement to said piston-hammer on its non-working stroke; the movement of said rotor being continuous at one speed.

3. In an impact tool of the explosion type, the combination with a cylinder having a through bore and adapted to receive a tool bit at one end of the same, a piston-hammer slidably mounted in said cylinder, means for imparting movement to said piston-hammer by an explosive force in one direction only whereby said piston-hammer may be brought into forcible engagement with such tool bit or similar element, of a rotor encircling the cylinder and journaled thereon, and comprising a cam element carried by said rotor, a cross-head carried by the piston-hammer and having ends projecting through the wall of the cylinder, means for securing said cross-head against endwise movement in said piston-hammer, and rollers carried by said cross-head for cooperation with said cam element whereby the latter may effect movement of the piston-hammer in one direction; said cam element being shaped to permit rapid movement of the piston-hammer on its power stroke and receive rotative impetus therefrom on such stroke and to impart a relatively retarded movement to said piston-hammer on its non-working stroke; the movement of said rotor being continuous at one speed.

4. In an impact tool of the explosive type, the combination of a cylinder having a through bore, a piston-hammer slidably mounted in said bore and providing, with the cylinder, inlet and explosion chambers at opposite ends of the same, a tool bit or similar element carried at one end of said cylinder, means for imparting movement to said piston-hammer by an explosive force in one direction only whereby said piston-hammer may be brought into forcible engagement with said tool bit or similar element, a rotor encircling the cylinder and journaled thereon, and comprising a cam element carried by said rotor, a cross-head carried by the piston-hammer and having ends projecting through the wall of the cylinder for cooperation with said cam element; the latter having a plurality of surfaces at different angles to effect a rapid movement of the piston-hammer on it spower stroke whereby said rotor receives its impetus therefrom and to effect a relatively slower movement to the piston-hammer on its non-working stroke; the movement of said rotor being continuous at one speed, spark forming means to effect such explosions, and means cooperating with the rotor for timing the explosions to drive the piston-hammer.

5. In an impact tool of the explosive type, the combination of a cylinder having a through bore, a piston-hammer slidably mounted in said bore and providing, with the cylinder, inlet and explosion chambers at opposite ends of the same, a tool bit or similar element carried at one end of said cylinder, means for imparting movement to said piston-hammer by an explosive force in one direction only whereby said piston-hammer may be brought into forcible engagement with said tool bit or similar element, a rotor encircling the cylinder and journaled thereon, and comprising a cam element carried by said rotor, a cross-head carried by the piston-hammer and having ends projecting beyond the surface of the cylinder for cooperation with said cam element; the latter having a plurality of surfaces comprising short, steep portions connected to longer portions inclined in less degree than the steep portions in the opposite direction and so related with respect to each other that the reciprocating strokes of the piston-hammer are performed in unequal time periods calculated in degrees of a revolution of the rotor so as to permit rapid and substantially unimpeded movement of the piston-hammer on its power stroke; the movement of said rotor being continuous at one speed.

6. In an impact tool of the explosive type, the combination of a cylinder having a through bore, a piston-hammer slidably mounted in said bore and providing, with the cylinder, inlet and explosion chambers at opposite ends of the same, a tool bit or similar element carried at one end of said cylinder, means for imparting movement in one direction only to said piston-hammer by an explosive force whereby said piston-hammer is forcibly projected against said tool bit or similar element, a rotor encircling the cylinder and journaled thereon, and comprising a cam element carried by said rotor, a cross-head carried by the piston-hammer and having ends projecting beyond the surface of the cylinder for cooperation with said cam element; the latter having a plurality of surfaces comprising short, steep portions connected to longer portions oppositely inclined in less degree than the steep portions and so related with respect to each other that the reciprocating strokes of the piston-hammer are performed in unequal time periods calculated in degrees of a revolution of the rotor so as to permit free and substantially unimpeded movement of the piston-hammer on its power stroke whereby said rotor may receive its impetus therefrom and impart a relatively slower movement to the piston-hammer on its non-working stroke, the movement of said rotor being continuous at one speed.

7. In a structure such as set forth in claim 4, a spark-plug mounted adjacent the explosion chamber of the cylinder, a plate supporting said spark-plug and forming one wall of said explosion chamber, a cap member secured to the cylinder and closing one end of the same, and means cooperating with said cap member for holding said spark-plug in place.

8. In a structure such as set forth in claim 4, a spark plug mounted adjacent the explosion chamber of the cylinder, a plate supporting said spark plug and forming one wall of said explosion chamber, a cap member secured to the cylinder and closing one end of the same, and means cooperating with said cap member for holding said spark plug in place.

9. In a structure such as set forth in claim 4, a spark-plug mounted adjacent the explosion chamber of the cylinder, an air cooled chamber for said spark-plug, a plate supporting said spark-plug and forming one wall of said explosion chamber and one wall of said spark-plug chamber, and means for holding said spark-plug in place.

10. In a structure such as set forth in claim 4, a spark plug, a plate supporting said spark plug and forming a wall of the chamber, a sleeve in said cylinder resting against said plate to hold said plate in place, and means for rigidly securing said sleeve to said cylinder, said cylinder being provided with a series of fins at one end thereof and with apertures through the walls of the cylinder registering with the alined slots in said sleeve for forming an air cooling chamber for said spark plug.

11. In a structure such as set forth in claim 1, a gas mixing device at one end of the cylinder, a handle secured to the cylinder at the opposite end of the same, a flexible operating element between the mixing device and the end of the tool, and an oscillable member for actuating said flexible operating element.

12. In a structure such as set forth in claim 1, a plurality of cam elements cooperating with the piston-hammer; said cam elements providing an irregular cam path with portions differing in angularity whereby the piston-hammer may move at a greater speed on its power stroke than upon its return stroke, and said cam elements further providing for a relatively inactive moment for said piston-hammer at the end of its power stroke.

13. In a structure such as set forth in claim 1, a plurality of cam elements cooperating with the piston-hammer and providing a cam path with portions differing in angularity whereby the piston may move at a greater speed on its outer stroke than on its return stroke, said path being widened between said cam elements at the end of the power stroke, whereby any recoil or rebound of the piston-hammer may be taken care of without contact with the cooperating parts.

14. In an impact tool of the explosive type, the combination of a cylinder, a piston-hammer slidably mounted in said cylinder, means for moving said piston-hammer in one direction by an explosive force, a cam rotor receiving motion from the piston-hammer and imparting motion thereto successively, a cross-head pin carried by the piston-hammer and serving as the cooperating element between the same and the cam rotor, and a lock screw for holding said pin in position; said cylinder being slotted to permit movement of the cross-head pin with respect thereto and apertured to permit positioning of said set screw after said cross-head pin has been assembled in the piston-hammer.

15. In an impact tool of the explosive type, the combination of a cylinder, a piston-hammer slidably mounted in said cylinder, means for moving said piston-hammer in one direction by an explosive force, a cam rotor receiving motion from the piston-hammer and imparting motion thereto successively, a cross-head pin carried by the piston-hammer and serving as the cooperating element between the same and the cam rotor, a lock screw for holding said pin in position, and retaining means for said lock screw; said cylinder being apertured to permit positioning of said set screw after said cross-head pin has been assembled in the piston-hammer.

16. In an impact tool of the explosive type, the combination of a cylinder, a piston-hammer slidably mounted in said cylinder and movable in one direction under the impulse of an explosive force, a cam rotor receiving motion from the piston-hammer and imparting motion thereto, a cross-head pin carried by the piston-hammer and serving as the cooperating element between the same and the cam rotor, a lock screw for holding said pin in position, a locking plate or washer carried by the piston-hammer and cooperating with said lock screw, and shoulders on the piston-hammer to prevent said lock washer turning; said cylinder being apertured to permit positioning of said set screw and locking washer after said cross-head pin has been assembled in the piston-hammer.

17. In an impact tool, the combination of a cylinder, a piston reciprocating therein on the principle of a two-cycle single-acting explosive engine in so far as the compression, transfer and explosion of the explosive mixture and the discharge from the cylinder of the products of combustion are concerned, a balance or momentum wheel, and means operative during the first portion of the forward working stroke of the piston to transmit from the piston to said balance wheel energy sufficient to maintain a substantially constant, angular speed of rotation of said wheel, and non-operative to transmit any energy thereto during the balance of said working stroke prior to the impact, said means being operative at the completion of said working stroke to transmit the kinetic energy of said rotating balance wheel to said piston to effect the return or compression stroke of said piston.

18. In an impact tool, the combination of a cylinder, a piston reciprocating therein on the principle of a two-cycle single-acting explosive engine in so far as the compression, transfer and explosion of the explosive mixture and the discharge from the cylinder of the products of combustion are concerned, a balance or momentum wheel, and means operative during the first portion of the forward working stroke of the piston to transmit from the piston to said balance wheel energy sufficient to maintain a substantially constant, angular speed of rotation of said wheel, and non-operative to transmit any energy thereto during the balance of said working stroke prior to the impact, said means being operative at the completion of said working stroke to transmit the kinetic energy of said rotating balance wheel to said piston to effect the return or compression stroke of said piston at a linear speed substantially slower than that of the piston during the working stroke.

19. In an impact tool, the combination of a cylinder, a piston reciprocating therein on the principle of a two-cycle single-acting explosive engine in so far as the compression, transfer and explosion of the explosive mixture and the discharge from the cylinder of the products of combustion are concerned, a balance or momentum wheel, means operatively engaged by said piston during the first portion of the forward working stroke of said piston to transmit from said piston to said wheel energy sufficient to maintain a substantially constant angular speed of rotation of said wheel, and out of engagement with which said piston travels the balance of its said working stroke prior to the impact, whereby said unimpeded piston moves at a high constantly increasing linear speed throughout the said balance of its working stroke; said means being operative at the completion of said working stroke to transmit back to said piston energy stored in said balance wheel to effect the return or compression stroke of said piston.

20. In an impact tool, the combination of a cylinder, a piston reciprocating therein on the principle of a two-cycle single-acting explosive engine in so far as the compression, transfer and explosion of the explosive mixture and the discharge from the cylinder of the products of combustion are concerned, a balance or momentum wheel, means operatively engaged by said piston during the first portion of the forward working stroke of said piston to transmit from said piston to said wheel energy sufficient to maintain a substantially constant angular speed of rotation of said wheel, and out of engagement with which said piston travels the balance of its said working stroke prior to the impact, whereby said unimpeded piston moves at a high constantly increasing linear speed throughout the said balance of its working stroke; said means being operative at the completion of said working stroke to transmit back to said piston energy stored in said balance wheel to effect the return or compression stroke of said piston at a constant linear speed substantially slower than the linear speed of the piston during its said working stroke.

21. In an impact tool, the combination of a cylinder, a piston reciprocating therein on the principle of a two-cycle single-acting explosive engine in so far as the compression, transfer and explosion of the explosive mixture and the discharge from the cylinder of the products of combustion are concerned, said piston being provided with a hammer-head, a balance or momentum wheel, impact receiving means mounted in said cylinder to receive the impact of said hammer-head as the piston nears and is substantially at the end of its working stroke and to transmit the blow or impact of said hammer to a suitable tool, means operatively engaged by said piston during the first portion of the working stroke thereof to impart to said wheel a substantially constant speed of rotation and out of engagement with such piston travels the balance of its said working stroke prior to the impact whereby said piston is projected during the said balance of its working stroke at a constantly increasing speed and said hammer-head moves at its highest linear speed at substantially the moment of impact.

22. In an impact tool, the combination of a cylinder, a piston reciprocating therein on the principle of a two-cycle single-acting explosive engine in so far as the compression, transfer and explosion of the explosive mixture and the discharge from the cylinder of the products of combustion are concerned, said piston being provided with a hammer-head rigid therewith, a balance or momentum wheel, impact receiving means mounted in said cylinder to receive the impact of said hammer-head as the piston nears and is substantially at the end of its working stroke and to transmit the blow or impact of said hammer to a suitable tool, means operatively engaged by said piston during the first portion of the working stroke thereof to impart to said wheel a substantially constant speed of rotation and out of engagement with such piston travels the balance of its said working stroke prior to the impact whereby said piston is projected during the said balance of its working stroke at a constantly increasing speed and said hammer-head moves at its highest linear speed at substantially the moment of impact.

23. In an impact tool, the combination of a cylinder, a piston operating within said cylinder to compress an explosive mixture during the working stroke and to transfer the same to the head end of said cylinder at the end of said working stroke on the principle of a single-acting two-cycle explosive engine, a hammer rigid with said piston and moving as one therewith, a balance wheel, a cam rigid with and rotating with said wheel, and an impact receiving member struck by said hammer immediately prior to the end of the working stroke of said piston, said piston being in operative engagement with said cam during the first part of the forward or working stroke to impart a substantially constant speed of rotation to said wheel and being out of contact or engagement with said cam during the balance of said working stroke prior to the impact whereby said piston and hammer are free to travel at a constantly increasing or accelerated linear speed during the balance of said working stroke and up to the moment of the impact of said hammer on said impact receiving member, the momentum of said wheel being operative to bring said cam into re-engagement with said piston and to return said piston to the rearward limit of the compression stroke.

24. In an impact tool, the combination of a cylinder, a piston operating within said cylinder to compress an explosive mixture during the working stroke and to transfer the same to the head end of said cylinder at the end of said working stroke on the principle of a single-acting two-cycle explosive engine, a hammer rigid with said piston and moving as one therewith, a balance wheel, a cam rigid with and rotating with said wheel, and an impact receiving member struck by said hammer immediately prior to the end of the working stroke of said piston, said piston being in operative engagement with said cam during the first part of the forward or working stroke to impart a substantially constant speed of rotation to said wheel and being out of contact or engagement with said cam during the balance of said working stroke whereby said piston and hammer are free to travel at a constantly increasing or accelerated linear speed during the balance of said working stroke and up to the moment of the impact of said hammer on said impact receiving member, the momentum of said wheel being operative to bring said cam into re-engagement with said piston and to return said piston to the rearward limit of the compression stroke, the linear speed of said piston on its working stroke being much higher than the linear speed of said piston on its return or compression stroke.

25. In an impact tool, the combination of a cylinder, a piston reciprocating therein at a constantly increasing speed during the latter part or portion of its forward or working stroke, and prior to impact and at a relatively slower uniform linear speed on its return or compression stroke, said piston being so reciprocated in said cylinder on the principle of a two-cycle single-acting explosive engine in so far as the compression, transfer and explosion of the explosive mixture and the discharge from the cylinder of the products of combustion are concerned, a hammer-head connected to and reciprocated by said piston, an impact receiving means mounted in said cylinder to receive the impact of said hammer-head as the piston nears and is substantially at the end of its working stroke.

26. In an impact tool, the combination of a cylinder, a piston reciprocating therein on the principle of a two-cycle single-acting explosive engine in so far as the compression, transfer and explosion of the explosive mixture and the discharge from the cylinder of the products of combustion are concerned, a balance or momentum wheel, means operatively engaged by said piston during the first portion of the forward working stroke of said piston to impart a substantially constant speed of rotation to said wheel and out of engagement with which said piston travels the balance of its said working stroke prior to the impact, said means being operative at the completion of said working stroke to transmit the energy stored in said balance wheel to said piston to effect the return or compression stroke of said piston, and means to start the automatic reciprocation of said piston by manually rotating said wheel.

27. In an impact tool, the combination of a cylinder, a piston-hammer reciprocable therein on the principle of a two-cycle single-acting explosive engine in so far as the compression, transfer and explosion of the explosive mixture and the discharge from the cylinder of the products of combustion are concerned, a rotor in operative engagement with said piston-hammer during the first part or portion of the working stroke of said piston-hammer and thereby receiving from said piston-hammer energy sufficient to keep said rotor rotating at a substantially constant speed of rotation, and out of operative engagement with which said piston-hammer travels the balance of its said working stroke prior to the impact, the energy so stored in said rotor being operative at the completion of said working stroke to bring said rotor into operative re-engagement with said piston-hammer and to effect the non-working or compression stroke of said piston-hammer.

28. In an impact tool, the combination of a cylinder, a piston-hammer reciprocable therein on the principle of a two-cycle single-acting explosive engine in so far as the compression, transfer and explosion of the explosive mixture and the discharge from the cylinder of the products of combustion are concerned, a rotor in operative engagement with said piston-hammer during the first part or portion of the working stroke of said piston-hammer and thereby receiving from said piston-hammer energy sufficient to keep said rotor rotating at a substantially constant speed of rotation, and out of operative engagement with which said piston-hammer travels the balance of its said working stroke prior to the impact, and at a constantly increasing speed, the energy so stored in said rotor being operative at the completion of said working stroke to bring said rotor into operative re-engagement with said piston-hammer and to effect the non-working or compression stroke of said piston-hammer.

29. In an impact tool, the combination of a cylinder, an impact-receiving member mounted at the end of said cylinder, a piston-hammer mounted to reciprocate in said cylinder, means to project said piston-hammer against said impact-receiving member on the working stroke of said piston-hammer, and at a constantly increasing speed during the second half of said working stroke up to substantially the moment of impact of said piston-hammer with said member and a rotor, driven at a substantially constant speed of rotation by the operative engagement of said piston-hammer therewith during the first half of said working stroke, and operative to effect the return or compression stroke of said piston-hammer.

30. In a impact tool, the combinaiton of a cylinder, an impact-receiving member mounted at the end of said cylinder, a piston-hammer mounted to reciprocate in said cylinder, means to project said piston-hammer against said impact-receiving member on the working stroke of said piston-hammer, and at a constantly increasing speed during the second half of said working stroke up to substantially the moment of impact of said piston-hammer with said member, and a rotor, driven at a substantially constant speed of rotation by the momentary operative engagement of said piston-hammer therewith during the first half of said working stroke, and operative to effect the return of compression stroke of said piston-hammer.

In witness whereof I have signed this specification.

C. S. SOMERVELL.